US011055117B2

(12) United States Patent
Zhou et al.

(10) Patent No.: US 11,055,117 B2
(45) Date of Patent: Jul. 6, 2021

(54) METHOD AND DEVICE FOR DISPLAYING, ON A LOCAL TERMINAL, AN APPLICATION EXECUTED ON A REMOTE SERVER BY MEANS OF A REMOTE OFFICE PROTOCOL

(71) Applicant: WALLIX, Saint-Honoré (FR)

(72) Inventors: Raphaël Zhou, Choisy le Roi (FR); Christophe Grosjean, Paris (FR)

(73) Assignee: WALLIX, Saint-Honoré (FR)

( * ) Notice: Subject to any disclaimer, the term of this patent is extended or adjusted under 35 U.S.C. 154(b) by 0 days.

(21) Appl. No.: 16/766,232

(22) PCT Filed: Oct. 31, 2018

(86) PCT No.: PCT/FR2018/052702
§ 371 (c)(1),
(2) Date: May 21, 2020

(87) PCT Pub. No.: WO2019/102088
PCT Pub. Date: May 31, 2019

(65) Prior Publication Data
US 2020/0371822 A1    Nov. 26, 2020

(30) Foreign Application Priority Data

Nov. 24, 2017  (FR) ...................................... 1761185

(51) Int. Cl.
*G06F 3/0481* (2013.01)
*G06F 9/451* (2018.01)
(Continued)

(52) U.S. Cl.
CPC ............ *G06F 9/452* (2018.02); *G06F 3/0481* (2013.01); *H04L 67/08* (2013.01); *H04L 67/42* (2013.01)

(58) Field of Classification Search
CPC ....... G06F 9/452; G06F 3/0481; H04L 67/08; H04L 67/42
See application file for complete search history.

(56) References Cited

U.S. PATENT DOCUMENTS 6,148,405 A * 11/2000 Liao ...................... H04L 9/3273
380/255
10,432,681 B1 * 10/2019 Kolomeitsev ......... H04L 65/604
(Continued)

OTHER PUBLICATIONS

International Search Report for International Application No. PCT/FR2018/052702 dated Feb. 26, 2019, 2 pages.
(Continued)

*Primary Examiner* — Rashawn N Tillery
(74) *Attorney, Agent, or Firm* — TraskBritt

(57) ABSTRACT

A method for displaying a graphic object, which is generated by a remote server in a local window, which is displayed on a display device, the local terminal communicating with the server via a proxy gateway for the remote office protocol, the gateway establishing a connection between the terminal and the server, the connection comprising a primary connection, which is established between the local terminal and the proxy gateway of the remote application type, and a secondary connection, which is established between the proxy gateway and the remote server, comprises a step of detecting the type of secondary connection and a step, carried out by the proxy gateway, of converting data, which are from the remote server, and which relate to a local window of the office type, into data, which are intended for the local terminal and which relate to a local window of the application type.

11 Claims, 1 Drawing Sheet

(51) Int. Cl.
*H04L 29/08* (2006.01)
*H04L 29/06* (2006.01)

(56) References Cited

U.S. PATENT DOCUMENTS

| | | | | |
|---|---|---|---|---|
| 2006/0230156 | A1* | 10/2006 | Shappir | G09G 5/14 709/227 |
| 2008/0181197 | A1* | 7/2008 | Yin | H04L 12/66 370/352 |
| 2013/0191627 | A1* | 7/2013 | Ylonen | H04L 63/1483 713/150 |
| 2013/0283171 | A1 | 10/2013 | Schick et al. | |
| 2015/0200821 | A1* | 7/2015 | Sade | H04L 63/1408 709/224 |
| 2015/0271162 | A1* | 9/2015 | Dulkin | H04L 63/08 726/7 |
| 2016/0342784 | A1* | 11/2016 | Beveridge | G06F 21/34 |
| 2018/0054471 | A1* | 2/2018 | Poe | H04L 67/141 |
| 2018/0121047 | A1* | 5/2018 | Goel | G06F 3/0485 |
| 2018/0159960 | A1* | 6/2018 | Farrugia | H04L 61/1511 |
| 2018/0234515 | A1* | 8/2018 | Rombakh | H04L 29/08 |
| 2018/0248849 | A1* | 8/2018 | Zhou | H04L 63/0281 |

OTHER PUBLICATIONS

International Written Opinion for International Application No. PCT/FR2018/052702 dated Feb. 26, 2019, 6 pages.

* cited by examiner

METHOD AND DEVICE FOR DISPLAYING, ON A LOCAL TERMINAL, AN APPLICATION EXECUTED ON A REMOTE SERVER BY MEANS OF A REMOTE OFFICE PROTOCOL

CROSS-REFERENCE TO RELATED APPLICATIONS

This application is a national phase entry under 35 U.S.C. § 371 of International Patent Application PCT/FR2018/052702, filed Oct. 31, 2018, designating the United States of America and published as International Patent Publication WO 2019/102088 A1 on May 31, 2019, which claims the benefit under Article 8 of the Patent Cooperation Treaty to French Patent Application Serial No. 1761185, filed Nov. 24, 2017.

TECHNICAL FIELD

The present disclosure relates to the field of displaying, on a display device of a local terminal, a graphic object generated by a remote server. More specifically, the present disclosure relates to a local terminal and to a remote server using a remote desktop protocol. It relates, in particular, to the remote desktop protocol known as RDP.

BACKGROUND

More and more users are using computer systems that can use protocols such as the remote desktop protocol, the independent computing architecture protocol (ICA), etc., to display, from a local terminal and by means of a remote connection, a desktop or an application of which the view is actually generated at a machine remote from the local terminal (said machine hereinafter being referred to as the remote server).

Conventionally, these computer systems transmit, to the remote server by means of a network connection, pressing actions made on a keyboard and clicks on a mouse of the local terminal, all the while ensuring that the display device of the local terminal is refreshed by transmitting to the local terminal updates to a display generated by the remote server. Moreover, the local terminal only receives display updates generated by the remote server.

In remote desktop protocols, such as the RDP protocol, there is a distinction between a "desktop connection" and a "remote-application connection" (or RemoteApp connection).

A desktop connection shows a view of a desktop generated by the remote server in a window (referred to as a local window or a local desktop window) displayed on a display device of the local terminal.

In this description, the word "desktop" is used in its conventional sense to mean a user's working environment and denotes all the graphic components displayed by a display device, which includes one or more display screens, when a connection is opened on a computer that generates a display effectively displayed on the display device. Conventionally, a desktop may comprise a "Start" menu, a taskbar, a notification zone and one or more windows corresponding to one or more applications open on the remote server. In addition, within the local window, a desktop connection displays the entire desktop generated by the remote server.

One disadvantage of a desktop connection is that the size of the desktop is predetermined before the connection is established and remains fixed for the duration of the connection: users cannot resize the desktop. The local window may be moved or made narrower. If the window is made narrower, one portion of the desktop is obscured; the visible portion may be adjusted using scrollbars arranged at the edges of the window.

A remote-application connection shows a view generated by an application being executed on the remote-application connection in one or more windows (referred to as local windows or local application windows) displayed on a display device of the local terminal. In addition, instead of showing the entire desktop of the remote server, only the view generated by the application being executed on the remote server is shown in the local application windows. The local application windows can be resized, moved around on a single screen of a display device or dropped between a plurality of screens of a display device, and they have their own entries on the taskbar of the desktop of the local terminal. Moreover, an application connection gives the user the impression (albeit the false impression) that the application of which the view is being displayed in the local application windows is an application being executed on the local terminal.

One disadvantage of the remote desktop protocols, e.g., the RDP protocol, is that it is not possible to establish a connection of either one type (desktop or application) between a local terminal and a remote server to access the resources proposed by the remote server, or of the other type (application or desktop).

Indeed, users do not necessarily know the type of resources they are led to use.

BRIEF SUMMARY

An object of the present disclosure is, in particular, to overcome all or some of the above-mentioned disadvantages.

According to a first aspect of the present disclosure, a method is proposed for displaying a graphic object, generated by a remote server, on a local terminal in a window, referred to as a local window, displayed on a display device of the local terminal, the local terminal communicating with the remote server by means of a proxy gateway for the remote desktop protocol, such as the RDP protocol, the gateway establishing a connection between the local terminal and the remote server, the connection having a primary, remote-application connection established between the local terminal and the proxy gateway, and a secondary connection established between the proxy gateway and the remote server.

The display method comprises a step of detecting the type of secondary connection.

When the detected type is a desktop connection, the method further comprises a step, implemented by the proxy gateway, of transforming data, originating from the remote server and relating to a local desktop window, into data intended for the local terminal and relating to a local remote-application window.

In the present disclosure, "remote desktop protocol" preferably means, in particular, the RDP protocol or any of its variations.

In the present disclosure, "desktop connection" preferably means, in particular, a remote-desktop connection according to the RDP protocol or any of its variations.

In the present disclosure, "remote-application connection" preferably means a RemoteApp connection according to the RDP protocol or any of its variations.

By means of the method according to the first aspect of the present disclosure, the local terminal receives data relating to a local application window and originating from the proxy gateway, regardless of whether the secondary connection is a desktop connection or a remote-application connection.

In addition, the use by the local terminal of the proxy gateway and of the method according to the present disclosure resolves the stated technical problem.

Indeed, the transformation, implemented by the proxy gateway, of the desktop window intended for the proxy gateway into an application window intended for the local terminal makes it possible to have just one type of connection between the local terminal and the proxy gateway.

When a user displays, in a plurality of respective local application windows, a plurality of applications of which the view is generated by a single remote server, in the optimum situation there is just one pair of primary/secondary application connections established between the local terminal and the proxy gateway and between the proxy gateway and the remote server for the plurality of applications.

As a result, it is possible for a user of the local terminal to simultaneously display, in local application windows, views of the desktops generated by remote servers and views generated by applications being executed on remote servers, which achieves the object of the present disclosure set out above.

Furthermore, the transformation is advantageous because it allows the user of a local terminal displaying a desktop generated by a remote server to resize the local window in which the remote desktop is displayed.

In order to enable an interaction between a user of the local terminal and the remote server, the method according to the present disclosure may comprise, when the detected type is a desktop connection, a step of transforming command data, originating from the local terminal and relating to the local application window, into command data intended for the remote server and relating to the local desktop window.

According to a second aspect of the present disclosure, a method is proposed for displaying a plurality of graphic objects generated by at least one remote server, the local terminal communicating with the at least one remote server by means of a proxy gateway for the remote desktop protocol, a primary connection established between the local terminal and the proxy gateway being a remote-application connection, and a plurality of secondary connections being established between the proxy gateway and the at least one remote server, comprising a display method according to the first aspect of the present disclosure or one or more of its improvements, wherein at least one of the plurality of secondary connections is a desktop connection and another of at least one of the plurality of secondary connections is a remote-application connection.

According to a third aspect of the present disclosure, a method according to the first aspect of the present disclosure or one or more of its improvements, or according to the second aspect of the present disclosure or one or more of its improvements, is proposed, wherein the remote desktop protocol provides:

in the case of a desktop connection, generation, by a remote server, of data intended for the client terminal and comprising coordinates relating to an origin point of a local window, in the case of a remote-application connection, generation, by a remote server, of data intended for the client terminal and comprising absolute coordinates relating to a fixed point of a display of the local terminal.

Preferably, the method may further comprise a step of recording data intended for the local terminal in the form of a video stream.

According to one embodiment, the data intended for the local terminal may relate to at least two local application windows, comprising a step of selecting a minimum rectangle comprising the at least two windows, and the recording step being limited to recording the data relating to the minimum rectangle.

The remote desktop protocol may be the RDP protocol, a desktop connection being a remote-desktop connection according to the RDP protocol, and a remote-application connection being a RemoteApp connection according to the RDP protocol.

According to a fourth aspect of the present disclosure, a computer program product is proposed, which is loadable directly into the internal memory of a computer, comprising portions of software code for executing the steps of the method according to the first, second or third aspect of the present disclosure or one or more of their improvements when the program is executed on a computer.

According to a fifth aspect of the present disclosure, a proxy gateway for the remote desktop protocol is proposed, comprising a computation unit arranged so as to carry out a method according to the first, second or third aspect of the present disclosure or one or more of their improvements.

at least one local terminal,
a plurality of remote servers,
a proxy gateway according to the fifth aspect of the present disclosure.

The at least one local terminal may comprise at least two local windows, the proxy gateway being configured to carry out the method according to the first, second or third aspect of the present disclosure or one or more of their improvements, by means of the at least two local windows.

The computation unit may be configured to generate a pick list of remote servers intended for one window of the at least one local terminal.

Preferably, each of the selections of the pick list corresponds to a type of remote connection for the remote desktop protocol, and the pick list may comprise at least two selections of remote servers for which the remote connection types are distinct.

BRIEF DESCRIPTION OF THE DRAWINGS

Other advantages and particular features of the present disclosure will become clear on reading the detailed description of non-limiting configurations and embodiments, given with reference to the accompanying drawings, in which.

DETAILED DESCRIPTION

Figure 1:
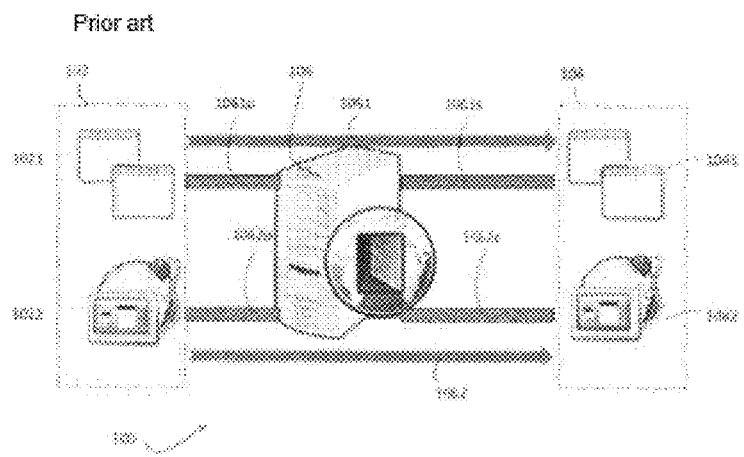
FIG. 1 is a schematic illustration of the closest prior art.

Since the embodiments described below are non-limiting, variants of the present disclosure that only include a selection of the described features, which are then isolated from the other described features, are conceivable if that selection of features is sufficient to impart a technical advantage or to distinguish the present disclosure in relation to the prior art. The selection includes at least one feature, preferably a functional feature without any structural details, or just a section of the structural details if the section alone is sufficient to impart a technical advantage or to distinguish the present disclosure in relation to the prior art.

In the drawings, any element appearing in several figures retains the same reference numeral.

With reference to FIG. 1, considered to be the closest prior art, a system 100 is disclosed, comprising firstly a plurality of terminals 102 (two terminals 1021 and 1022 according to the prior art shown) and secondly a plurality of remote servers 104 (two remote servers 1041 and 1042 according to the prior art shown).

The system 100 further comprises a proxy gateway 106 for the remote desktop protocol, arranged so as to establish a connection 1061 between the client 1022 and the server terminal 1042 and a connection 1062 between the client 1022 and the server terminal 1042.

More specifically, the connection 1061 comprises a primary connection 1061p established between the local terminal 1021 and the proxy gateway 106 in the form of a remote-application connection, and a secondary connection 1061s established between the proxy gateway and the remote server 1041 in the form of a remote-application connection.

The connection 1062 comprises a primary connection 1062p established between the local terminal 1021 and the proxy gateway 106 in the form of a desktop connection, and a secondary connection 1062s established between the proxy gateway and the remote server 1042 in the form of a desktop connection.

The connections 1061p and 1061s are both remote-application connections and are shown by a pattern of horizontal straight stripes.

The connections 1062p and 1062s are both desktop connections and are shown by a pattern of vertical straight stripes.

According to the prior art, it is not possible to indistinctly open remote-application connections or desktop connections from one single local terminal connected by means of a remote-application connection.

This hindrance is overcome by, according to one embodiment of a system 200 according to the present disclosure, which comprises:
- a terminal 2021,
- a plurality of remote servers 204, two remote servers 2041 and 2042,
- a proxy gateway 206 arranged so as to establish a connection 2061 between the client 2021 and the server terminal 2041 and a connection 2062 between the client 2021 and the server terminal 2042.

The proxy gateway 206 for the remote desktop protocol is arranged so as to establish a connection 2061 between the client 2021 and the server terminal 2041 and a connection 2062 between the client 2021 and the server terminal 2042.

More specifically, the connection 2061 comprises a primary connection 2061p established between the local terminal 2021 and the proxy gateway 206 in the form of a remote-application connection, and a secondary connection 2061s established between the proxy gateway and the remote server 2041 in the form of a remote-application connection.

Unlike in the prior art, the connection 2062 comprises the primary connection 2061p and a secondary connection 2062s established between the proxy gateway and the remote server 2042 in the form of a desktop connection.

The remote-application connections 2061p and 2061s are shown by a pattern of horizontal straight stripes.

The connection 2062s is a desktop connection and is shown by a pattern of vertical straight stripes.

Using the system according to the present disclosure, it is possible to indistinctly open remote-application connections or desktop connections from one single local terminal connected by means of a remote-application connection.

Figure 3:
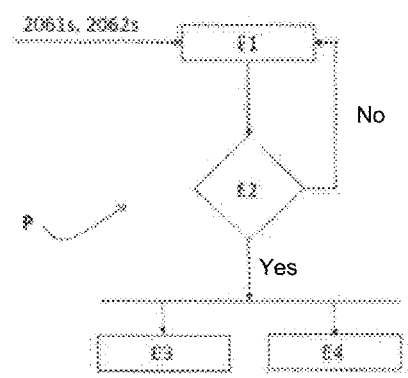
FIG. 3 is a schematic illustration of a method according to an embodiment of the present disclosure.

To this end, the proxy gateway comprises a computation unit arranged so as to carry out a method P according to one embodiment of the present disclosure, as shown in FIG. 3.

The method P can be carried out by executing, on the proxy gateway, a computer program product formed by portions of software code that can be loaded directly or indirectly into the internal memory of the proxy gateway.

The method P according to the present disclosure is a method for displaying a graphic object, generated by one of the remote servers, for example, the servers 2041 or 2042, on the local terminal (in this case the local terminal 2021) in a window, referred to as a local window, displayed on a display device of the local terminal.

Figure 2:
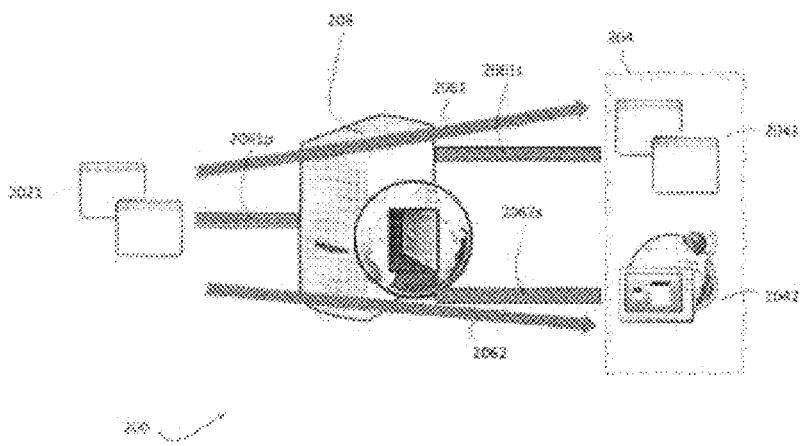
FIG. 2 is a schematic illustration of an embodiment of a system according to the present disclosure.

The method P comprises:
- a step E1 of detecting the type of secondary connection, for example, connections 2061s or 2062s of FIG. 2,
- a step E2 of testing the detected type and, when the detected type is a desktop connection (the connection 2062s in the example shown in FIG. 2),
- a step E3, implemented by the proxy gateway 206, of transforming data, originating from the remote server and relating to a local desktop window, into data intended for the local terminal and relating to a local application window.

The step E1 is carried out by analyzing configuration data of the remote server.

The step E2 is carried out by comparing the analysis result at a predetermined value, the predetermined value corresponding to a desktop connection.

The transformation step E3 implemented by the proxy gateway will now be described in more detail.

The connection handled in this step is a desktop connection. In addition, the proxy gateway receives data originating from the remote server according to the remote desktop protocol, the data being specific to the protocol type. More specifically, according to the remote desktop mode of the RDP protocol, the data originating from the server comprise drawing orders, the coordinates of which are relative, and data in relation to an upper left-hand corner of a local desktop window.

The data to be sent to the local terminal are data relating to a local remote-application window. According to the RemoteApp mode of the RDP protocol, the drawing orders comprise absolute coordinates, which are data related to an upper left-hand corner of the desktop of the client computer.

In addition, it is necessary to transform the drawing data originating from the remote server in order to obtain remote-application data at the local terminal.

While noting XYdrawingServer the relative coordinates of a point on the drawing that are received from the remote server, the proxy gateway has to address absolute coordinates XYdrawingAbsolute of the drawing to the client terminal by translating the relative coordinates by a vector XYoriginWindowApp indicating the absolute coordinates of the local remote-application window, which can be written as follows:

$$XYdrawingAbsolute = XYdrawingServer + XYoriginWindowApp.$$

The absolute coordinates of the local application window are defined by the proxy gateway in various ways. If the user subsequently modifies them, the gateway receives update messages over the network connection.

When a local terminal receives data relating to a local application window, the data typically comprise contours of the window to be displayed, such as icons, a title bar, buttons and borders. However, when the proxy gateway receives data relating to a local desktop window, the data relating to the local window do not comprise window contours.

In addition, the method may comprise a step, implemented by the proxy gateway, of transforming data, originating from the remote server and relating to a local desktop window, into data intended for the local terminal and relating to a local application window, comprising a step of adding window contour elements and of processing, when data originating from the local terminal are received, at least one event generated at the elements. Typically, a click on a close button of the contour of the window will be processed by the gateway so as to generate closure orders of the corresponding secondary connection and to no longer occupy the drawing zone on the local terminal.

The data to be sent to the local terminal are data relating to a local remote-application window. According to the RemoteApp mode of the RDP protocol, the drawing orders comprise absolute coordinates, which are data related to an upper left-hand corner of the desktop of the client computer.

The method P depicted in FIG. 3 further comprises a step E4, implemented concurrently with step E3 when the detected type is a desktop connection.

It should be understood that if the drawing coordinates have to undergo transformation, the coordinates relating to command data originating from the local terminal and relating to the local remote-application window must likewise undergo transformation (an inverse transformation) before command data intended for the remote server and relating to the local desktop window are generated.

The method according to the present disclosure thus makes it possible for a local client terminal to display data originating from a desktop connection in a local application window.

As already explained, when a user displays, in a plurality of respective local application windows, a plurality of applications of which the view is generated by a single remote machine (in this case the proxy gateway), in the optimum situation there is just one application connection established between the local terminal and the proxy gateway for the plurality of applications.

In addition, the method P allows a user of the local terminal to simultaneously display, in local application windows, a view of a desktop generated by a remote server and a view generated by an application being executed on the remote server, which achieves the object of the present disclosure set out above.

Prior to the detection step, the method P may also comprise, after an optional step of connecting the local terminal to the proxy gateway, a step of presenting to the local terminal a pick list of remote servers intended for the local terminal.

The list of remote servers intended for the local terminal may depend on the user of the local terminal, on their authorization levels, etc.

The list of remote servers may comprise at least two selections of remote servers for which the remote connection types are distinct.

When a user displays, in a plurality of respective local application windows, a plurality of applications of which the view is generated by a single remote machine (in this case the proxy gateway), it may be advantageous to create the same number of connections between the local terminal and the proxy gateway as applications, for example, for security reasons.

By default, there is just one connection between the local terminal and the proxy gateway.

In order to create a plurality of connections between the local terminal and the proxy gateway, it is possible to use a control field specific to the remote desktop protocol to index the connection at the proxy gateway. In that case, the proxy gateway can be configured to pool a plurality of connections within one single primary connection or, alternatively, to separate them. The Load Balance Info field of the RDP protocol can be used by the proxy gateway for this purpose, since two RDP connections having two different value fields are two distinct connections.

The use of the method according to the present disclosure makes it possible to resize a local desktop window. To this end, when a primary remote-application session displays an application window showing a desktop of a remote server, the method according to the present disclosure may comprise:
  a step of detecting commands originating from the local terminal and relating to the local application window, the commands corresponding to a resizing of the application window,
  a step of closing the secondary desktop session previously established between the proxy gateway and the remote server,
  a step of opening a second secondary desktop session between the proxy gateway and the remote server, comprising size parameters corresponding to the resizing of the application window.

The desktop windows converted into application windows virtually use a desktop, which creates the size of all the joined surfaces of physical screens of the local client. This may be disproportionately large compared with the size of the zone effectively occupied by the application window.

For example, if the local client has two 1920×1080 Full HD screens and the server has an 800×600 screen, the desktop of the server is very small compared with the desktop of the local client.

This problem has no impact on the size taken up by the recording on the storage unit. By contrast, the vast non-meaning zone greatly simplifies the visualization of recorded sessions.

The gateway sees the display orders of a RemoteApp application session pass through like drawing orders of the application windows on all the screens of the user station.

During recording, if nothing is done, the geometry of the orders leads to a rectangular recording encompassing all the screens of the user station. Unless they are in full-screen mode, the windows may appear therein lost in the middle of a large black rectangle.

To prevent this, the method according to the present disclosure may comprise a step of determining a rectangle of a minimum width and height that is calculated so as to encompass the windows for the duration of the session.

Only the content of the determined rectangle may be recorded in a video, so as to minimize the useless space around the windows. Where the application has just one window, the determined rectangle corresponds exactly to the surface of the application window.

For real-time visualization, the method may comprise real-time determination of a rectangle so as to encompass all the windows visible at the time of the computation. The real-time visualization may thus see its size vary over the course of the session.

It goes without saying that the present disclosure is not limited to the examples that have just been described, and that numerous variations may be made to these examples without departing from the scope of the present disclosure. In addition, the different features, forms, variants and embodiments of the present disclosure may be combined with one another in various combinations, unless they are incompatible with one another or mutually exclusive.

The invention claimed is:

1. A method for displaying a graphic object, generated by a remote server, on a local terminal in a local window displayed on a display device of the local terminal, the local terminal communicating with the remote server by way of a proxy gateway for a remote desktop protocol, the proxy gateway establishing a connection between the local terminal and the remote server, the connection having a primary remote-application connection established between the local terminal and the proxy gateway according to the remote desktop protocol, and a secondary connection established between the proxy gateway and the remote server according to the remote desktop protocol, the remote desktop protocol providing:
in the case of a desktop connection, generation, by a remote server, of data intended for the client terminal and comprising coordinates relating to an origin point of a local window,
in the case of a remote-application connection, generation, by a remote server, of data intended for the client terminal and comprising absolute coordinates relating to a fixed point of a display of the local terminal,
wherein the method comprises a step of detecting the type of secondary connection, and, when the detected type is a desktop connection, the method further comprises a step, implemented by the proxy gateway, of transforming data, which comprise the relative coordinates, originate from the remote server and relate to a local desktop window, into data that comprise the absolute coordinates, intended for the local terminal and relate to a local application window.

2. The method of claim 1, further comprising, when the detected type is desktop connection, a step of transforming command data, originating from the local terminal and relating to the local application window, into control data intended for the remote server and relating to the local desktop window.

3. A method for displaying a plurality of graphic objects generated by at least one remote server, the local terminal communicating with the at least one remote server by means of a proxy gateway for the remote desktop protocol, a primary connection established between the local terminal and the proxy gateway being a remote-application connection, and a plurality of secondary connections being established between the proxy gateway and the at least one remote server, comprising a display method according to claim 1, wherein at least one of the plurality of secondary connections is a desktop connection and another of the at least one of the plurality of secondary connections is a remote-application connection.

4. The method according to claim 1, further comprising a step of recording data intended for the local terminal in the form of a video stream.

5. The method of claim 4, wherein the data intended for the local terminal relate to at least two local application windows, comprising a step of selecting a minimum rectangle comprising the at least two windows, and the recording step being limited to recording the data relating to the minimum rectangle.

6. The method of claim 5, wherein the remote desktop protocol is the RDP protocol, a desktop connection being a remote-desktop connection according to the RDP protocol, and a remote-application connection being a RemoteApp connection according to the RDP protocol.

7. A non-transitory computer-readable medium storing instructions thereon that, when executed by at least one processor, cause the at least one processor to perform steps comprising:

displaying a graphic object, generated by a remote server, on a local terminal in a local window displayed on a display device of the local terminal, the local terminal communicating with the remote server by way of a proxy gateway for a remote desktop protocol, the proxy gateway establishing a connection between the local terminal and the remote server, the connection having a primary remote-application connection established between the local terminal and the proxy gateway according to the remote desktop protocol, and a secondary connection established between the proxy gateway and the remote server according to the remote desktop protocol, the remote desktop protocol providing:
in the case of a desktop connection, generation, by a remote server, of data intended for the client terminal and comprising coordinates relating to an origin point of a local window,
in the case of a remote-application connection, generation, by a remote server, of data intended for the client terminal and comprising absolute coordinates relating to a fixed point of a display of the local terminal; and detecting the type of secondary connection, and, when the detected type is a desktop connection, a step, implemented by the proxy gateway, of transforming data, which comprise the relative coordinates, originate from the remote server and relate to a local desktop window, into data that comprise the absolute coordinates, intended for the local terminal and relate to a local application window.

8. A proxy gateway for the remote desktop protocol, including a computation unit storing instructions that, when executed by the computation unit, carry out a method comprising:

displaying a graphic object, generated by a remote server, on a local terminal in a local window displayed on a display device of the local terminal, the local terminal communicating with the remote server by way of a proxy gateway for a remote desktop protocol, the proxy gateway establishing a connection between the local terminal and the remote server, the connection having a primary remote-application connection established between the local terminal and the proxy gateway according to the remote desktop protocol, and a secondary connection established between the proxy gateway and the remote server according to the remote desktop protocol, the remote desktop protocol providing:
in the case of a desktop connection, generation, by a remote server, of data intended for the client terminal and comprising coordinates relating to an origin point of a local window,
in the case of a remote-application connection, generation, by a remote server, of data intended for the client terminal and comprising absolute coordinates relating to a fixed point of a display of the local terminal; and detecting the type of secondary connection, and, when the detected type is a desktop connection, a step, implemented by the proxy gateway, of transforming data, which comprise the relative coordinates, originate from the remote server and relate to a local desktop window, into data that comprise the absolute coordinates, intended for the local terminal and relate to a local application window.

9. A system comprising:
at least one local terminal,
a plurality of remote servers,
a proxy gateway according to claim 8.

10. The system of claim 9, wherein the computation unit is configured to generate a pick list of remote servers intended for one of the at least one local terminals.

11. The system of claim 10, wherein each of the selections of the pick list corresponds to a type of remote connection for the remote desktop protocol, and wherein the pick list comprises at least two selections of remote servers for which the remote connection types are distinct.

\* \* \* \* \*